United States Patent [19]

Ogawa

[11] Patent Number: 5,761,548
[45] Date of Patent: Jun. 2, 1998

[54] ZOOM FINDER

[75] Inventor: Yuji Ogawa, Tokyo, Japan

[73] Assignee: Asahi Kogaku Kabushiki Kaisha, Tokyo, Japan

[21] Appl. No.: 803,147

[22] Filed: Feb. 19, 1997

[30] Foreign Application Priority Data

Feb. 20, 1996 [JP] Japan ................... 8-032368

[51] Int. Cl.⁶ .............................. G03B 5/00; G03B 15/03; G03B 17/04
[52] U.S. Cl. ................... 396/62; 396/84; 396/349
[58] Field of Search .................. 396/62, 84, 379, 396/378, 349

[56] References Cited

U.S. PATENT DOCUMENTS

| | | |
|---|---|---|
| 4,936,664 | 6/1990 | Haraguchi et al. . |
| 4,944,030 | 7/1990 | Haraguchi et al. . |
| 5,068,678 | 11/1991 | Mogamiya et al. . |
| 5,258,792 | 11/1993 | Suzuki et al. . |
| 5,345,285 | 9/1994 | Hasushita et al. . |
| 5,345,287 | 9/1994 | Taguchi . |

Primary Examiner—W. B. Perkey
Attorney, Agent, or Firm—Greenblum & Bernstein, P.L.C.

[57] ABSTRACT

In a zoom finder of a zoom lens camera, a movable variable power lens is supported to move in an optical axis direction and is moved to predetermined positions by a cam member which is driven in association with movement of the zoom lens. The cam member is provided with a groove or a projection at a reference position. The cam member is held in the reference position by a holding member which is engaged by the groove or the projection before assembling the finder to the zoom lens camera.

11 Claims, 3 Drawing Sheets

ZOOM FINDER

BACKGROUND OF THE INVENTION

1. Field of the Invention

The present invention relates to a zoom finder for a zoom compact camera.

2. Description of the Related Art

Conventionally, a zoom compact camera is provided with a zoom finder which varies the field of view in association with a movement of a zoom-photographing lens. In the zoom finder, a movable zoom lens (movable variable power lens) which is supported to move in an optical axis direction, is moved to a predetermined position by a cam member which is driven in association with the movement of the zoom-photographing lens.

While it is necessary to associate the zoom finder with the zoom-photographing lens upon assembly, in conventional zoom lenses no special mechanism exists to ensure that the zoom finder and the zoom lenses are properly associated, thus resulting in a poor assembling operation or a failure to associate the zoom finder with the zoom-photographing lens.

SUMMARY OF THE INVENTION

It is an object of the present invention to provide a zoom finder which can be certainly and easily associated with a zoom-photographing lens. Namely, the primary object of the present invention is to provide a zoom finder in which a movable zoom lens can be held in a predetermined position prior to an assembling operation.

To achieve the object mentioned above, in a zoom finder according to the present invention, a movable zoom lens which is supported to move in the optical axis direction is moved to a predetermined position by a cam member which is driven in association with a movable member. The cam member is provided with a reference position, and a groove or projection is provided at the reference position. The cam member is held in the reference position by a holding member which is engaged by the groove or projection.

Namely, according to an aspect of the present invention, there is provided a zoom finder which is driven in association with a zoom-photographing lens, having a movable zoom lens which is supported to move in the optical axis direction. A cam member is driven in association with the zoom-photographing lens to vary the position of the movable zoom lens in the optical axis direction. A groove or projection is provided at a reference position provided on the cam member. A holding member is engaged by the groove or projection located in the reference position of the cam member to hold the cam member in the reference position.

The present invention can be applied to any cam member. For instance, the invention can be applied to a cylindrical rotary cam. The cylindrical rotary cam is preferably provided with a circumferential click groove which defines the reference position. The holding member can be biased in a direction to engage in the click groove. The holding member can be made of an additional or independent element or can be made of an existing illumination angle varying member provided in a zoom strobe device. Namely, the holding member can be constituted by a holding member of a conventional zoom strobe device which is supported to move in the optical axis direction.

The zoom-photographing lens can be provided with a zoom-photographing section and a transfer section between the zoom-photographing section and an accommodation position. The cam member can be provided with a zooming portion corresponding to the zoom-photographing section to move the movable zoom lens and a transferring portion corresponding to the transfer section in which no movement of the movable zoom lens occurs. The reference position is preferably provided in the transferring portion of the cam member.

The present disclosure relates to subject matter contained in Japanese Patent Application No. 08-32368 (filed on Feb. 20, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
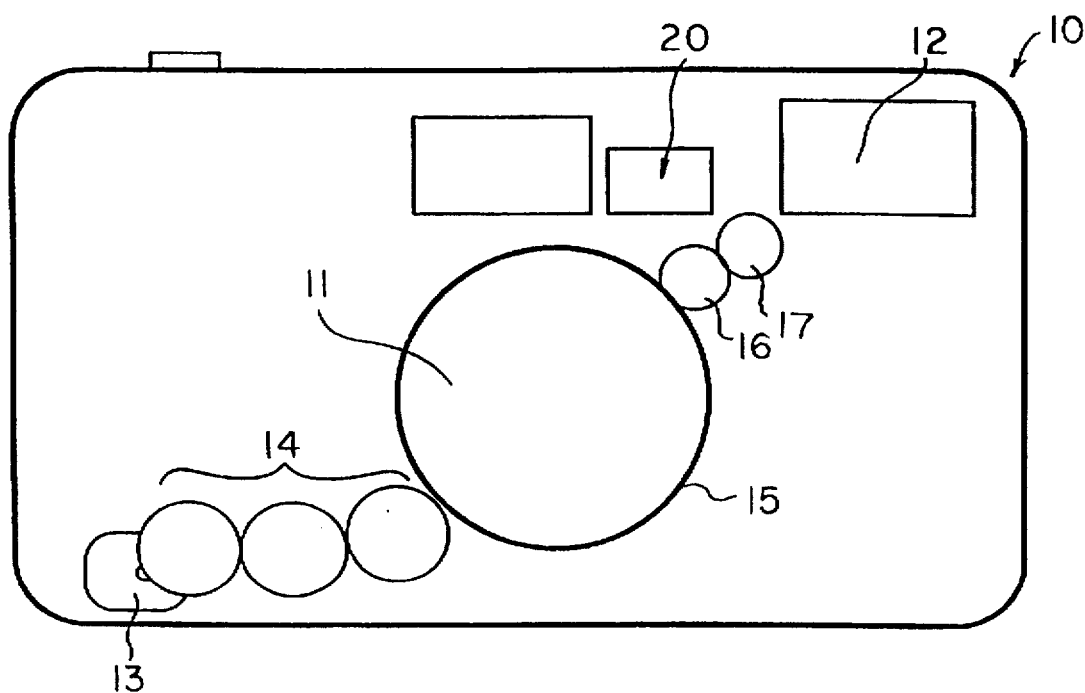
FIG. 1 is a front elevational view of a zoom compact camera having a zoom finder according to the present invention.

As viewed in FIG. 1, a zoom compact camera 10 is provided on a substantially central portion thereof with a zoom-photographing lens 11, a zoom strobe device 12 is provided on an upper right portion of the front surface of the camera body, and a zoom finder 20 is provided on the left side of the zoom strobe device 12.

A rotation of a drive motor 13 is transmitted to the zoom-photographing lens 11 through a gear train 14, and is also transmitted to a cylindrical cam 17 through an outer peripheral gear 15 of the zoom-photographing lens 11 and a transmission gear 16. The cylindrical cam 17 simultaneously drives the zoom strobe device 12 and the zoom finder 20.

Figure 2:
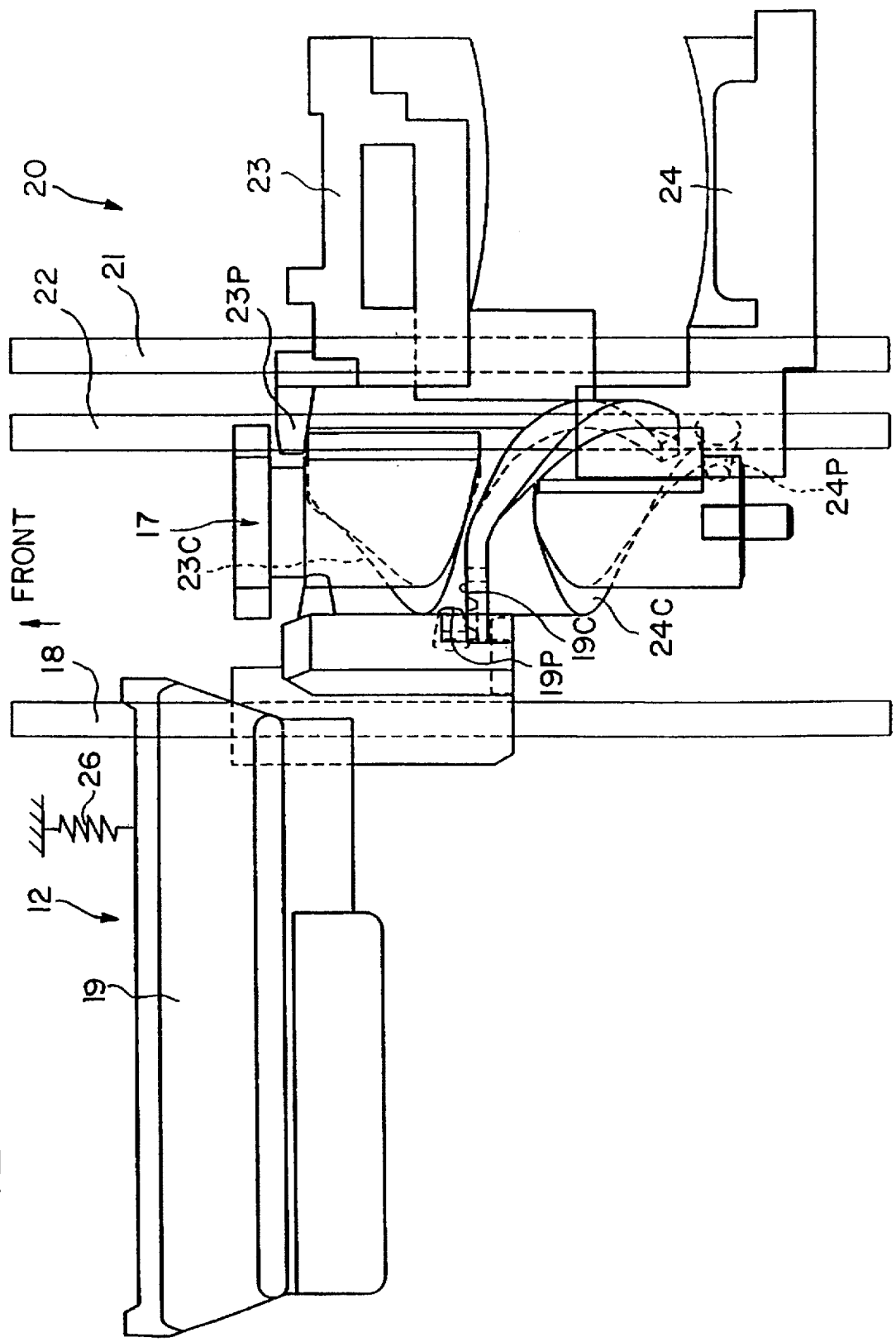
FIG. 2 is a plan view of a zoom finder and a cam mechanism of a zoom strobe device; and, FIG. 3 is a developed view of a cylindrical cam of the cam mechanism shown in FIG. 2.

The cylindrical cam 17 is constructed as shown in FIG. 2. The zoom strobe device 12, the zoom finder 20, and the cylindrical cam 17 are assembled into a finder/strobe assembly which is incorporated in the zoom compact camera 10 together with the zoom-photographing lens 11, etc.

The zoom strobe device 12 is provided with a light emission block 19 which is guided by a guide rail 18 to linearly move forward and backward to thereby vary the strobe emission angle (illumination angle) of the strobe device 12. The light emission block 19 constitutes an illumination angle varying member, per se known, having an integral light emitter and a reflector (both not shown).

The zoom finder 20 is provided with movable variable power lenses (lens frames) 23 and 24 which are guided to linearly move in an optical axis direction along guide rails 21 and 22. The cylindrical cam 17 is adapted to move the light emission block 19 and the movable variable power lenses 23, 24 to predetermined positions in association with the zoom-photographing lens 11. The cylindrical cam 17 is provided with cylindrical cam surfaces 19C, 23C and 24C for the light emission block 19 and the movable variable power lenses 23 and 24, respectively. The light emission block 19 and the movable variable power lenses 23 and 24 are provided with integral cam followers in the form of projections 19P, 23P and 24P that engage with the respective cylindrical cam surfaces 19C, 23C and 24C. The light emission block 19 is biased by a biasing spring 26 to press the projection (cam follower) 19P against the corresponding cylindrical cam surface 19C. Similarly, the movable variable power lenses 23 and 24 are biased by respective springs (not shown) to press the projections (cam followers) 23P and 24P against the corresponding cylindrical cam surfaces 23C and 24C.

Figure 3:
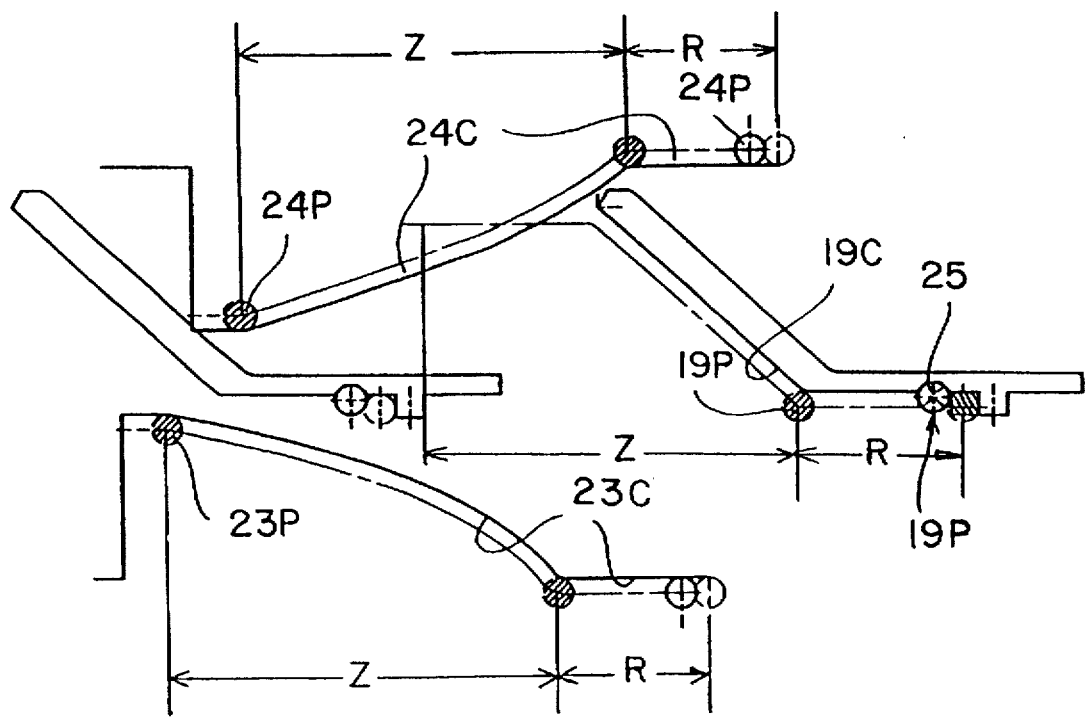

The cylindrical cam surfaces 19C, 23C and 24C are each provided with a zoom section Z and a transfer section R to transfer from the zoom section Z to an accommodation section, as shown in FIG. 3 (developed view). The zoom section Z corresponds to a zoom-photographing position of the zoom-photographing lens 11, in which the positions of the light emission block 19 and the movable variable power lenses 23, 24 are varied to vary the strobe emission angle and the field of view of the finder corresponding to the photographing focal length of the zoom-photographing lens 11. The transfer section R corresponds to a zone in which the zoom-photographing lens 11 moves between the zoom-photographing position (wide-angle extremity) and the accommodation position (retracted position). For the cylindrical cam surfaces 23C and 24C, the entirety of the transfer section R is defined by a linear profile (perpendicular to the optical axis) in which no movement of the movable variable power lenses 23 and 24 occurs. The light emission block 19 reaches a front movement limit in the zoom section Z. Thus, the cylindrical cam surface 19C terminates at an intermediate portion of the zoom section Z. Namely, there is no cylindrical cam surface 19C at the front end portion of the zoom section Z.

The transfer section R of the cylindrical cam surface 19C is substantially defined by a linear profile perpendicular to the optical axis, in which no movement of the movable variable power lenses 23 and 24 occurs, similar to the cylindrical cam surfaces 23C and 24C. The cylindrical cam surface 19C is provided with a click groove 25 in the transfer section R. The click groove 25 defines a reference position of the cylindrical cam 17, in which when the cam follower (projection) 19P of the light emission block 19 is fitted in the click groove 25, the cam follower 19P is biased toward the cylindrical cam surface 19C, and the cylindrical cam 17 is engaged with a slight force. When the cam follower 19P is fitted in the click groove 25, the movable zoom lens frames 23 and 24 are held in the reference position in which the cam followers 23P and 24P are correctly brought into contact with the cylindrical cam surfaces 23C and 24C in the transfer section R.

Thus, when the finder strobe block having the zoom strobe device 12, the zoom finder 20 and the cylindrical cam 17 is incorporated in the zoom compact camera 10, the cylindrical cam 17 is rotated to engage the cam follower 19P in the click groove 25 at the reference position. In the reference position, since the cam followers 23P and 24P of the movable variable power lenses 23 and 24 correctly contact the cylindrical cam surfaces 23C and 24C in the transfer section R, the association position of the zoom finder 20 with the zoom-photographing lens 11 can be easily found, thus resulting in an easy establishment of the association. Hence, the assembling operation is improved and there is no error in association of the zoom-photographing lens 11 and the finder 20.

In the illustrated embodiment, if the cylindrical cam 17 is driven in the forward or backward direction after completion of the assembling operation, the light emission block 19 moves slightly when the cam follower 19P is engaged in the click groove 25. However, no problem is caused due to the slight movement of the light emission block 19, since no movement of the light emission block 19 is visible.

Note that although the click groove 25 which is adapted to define the reference position of the cylindrical cam 17, is provided on the cylindrical cam surface 19C, and a holding member to be fitted in the click groove 25 is in the form of the cam follower (projection) 19P of the light emission block 19 in the illustrated embodiment, the click groove 25 and the holding member can be provided independently of the cylindrical cam surface or the light emission block.

As can be understood from the above discussion, according to the present invention, the movable zoom lens frames are held in a predetermined position prior to the assembling operation, and hence, not only can the assembling operation be easily and certainly carried out, but also the zoom finder can be correctly associated with the zoom-photographing lens.

What is claimed is:

1. A zoom finder which is driven in association with a zoom-photographing lens, comprising:

a movable variable power lens which is supported to move in an optical axis direction of said zoom finder;

a cam member which is driven in association with said zoom-photographing lens to vary a position of said movable variable power lens in said optical axis direction;

one of a groove and a projection formed at a reference position provided on said cam member; and a holding member which is engaged by said one of a groove and a projection of said cam member to hold said cam member in said reference position.

2. A zoom finder according to claim 1, wherein said cam member is a cylindrical rotary cam which is provided with a circumferential click groove which defines said reference position.

3. A zoom finder according to claim 2, further comprising biasing means for biasing said holding member in a direction to engage in said click groove.

4. A zoom finder according to claim 3, further comprising an illumination angle varying member which is supported to move in said optical axis direction, said illumination angle varying member comprising said holding member.

5. A zoom finder according to claim 1, wherein said zoom-photographing lens is provided with a zoom-photographing section and a transfer section between said zoom-photographing section and an accommodation position, and wherein said cam member is provided with a zooming section corresponding to said zoom-photographing section to move said movable variable power lens, and a transfer section corresponding to said transfer section of said zoom-photographing lens in which no movement of said movable variable power lens occurs.

6. A zoom finder according to claim 5, wherein said reference position is provided in said transfer section of said cam member.

7. A zoom finder according to claim 1, further comprising a biasing spring for biasing said holding member toward said one of a groove and a projection.

8. A zoom compact camera having a zoom-photographing lens, a zoom finder and a zoom strobe, comprising:

a pair of movable variable power lenses of said zoom finder, said movable variable power lenses being supported to move in an optical axis direction of said zoom finder;

an illumination angle varying member of said zoom strobe, said illumination angle varying member being supported to move in said optical axis direction of said zoom strobe;

a cam member having cam surfaces for said movable variable power lenses and said illumination angle varying member, said cam member being driven in association with said zoom-photographing lens to vary a position of said movable variable power lenses and said illumination angle varying member in said optical axis direction;

a groove provided at a reference position formed on said cam surface for said illumination angle varying member, and a holding projection provided on said illumination angle varying member, said holding projection being engaged by said groove of said cam member to hold said cam member in said reference position.

9. A zoom compact camera according to claim 8, wherein said cam member is a cylindrical rotary cam which is provided with a circumferential click groove which defines said reference position.

10. A zoom compact camera according to claim 8, further comprising biasing means for biasing said illumination angle varying member in a direction to engage in said groove.

11. A zoom compact camera according to claim 8, wherein said zoom-photographing lens is provided with a zoom-photographing section and a transfer section between said zoom-photographing section and an accommodation position, and wherein said cam surfaces of said cam member are each provided with a cam zooming section corresponding to said zoom-photographing section and a cam transfer section corresponding to said transfer section of said zoom-photographing lens, said reference groove being provided at said cam transfer section of said cam surface for said illumination angle varying member.

* * * * *

UNITED STATES PATENT AND TRADEMARK OFFICE
CERTIFICATE OF CORRECTION

PATENT NO. : 5,761,548
DATED : June 2, 1998
INVENTOR(S) : Yuji Ogawa

It is certified that error appears in the above-identified patent and that said Letters Patent is hereby corrected as shown below:

On the title page, Item[73]:
Assignee, change "Asahi Kogaku Kabushiki Kaisha" to ---Asahi Kogaku Kogyo Kabushiki Kaisha---.

Signed and Sealed this

Fifteenth Day of June, 1999

Attest:

Q. TODD DICKINSON

Attesting Officer

Acting Commissioner of Patents and Trademarks